April 8, 1952  E. DE V. TOMPKINS  2,591,747
DUAL RECIPROCATING BLADE SAWING APPARATUS
Filed July 17, 1946  6 Sheets-Sheet 3
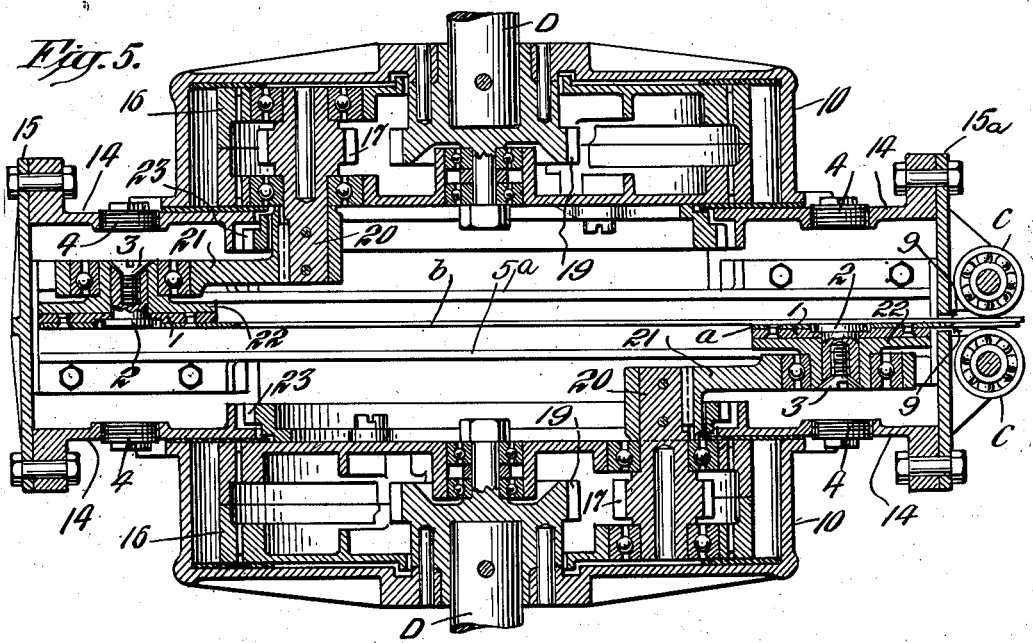
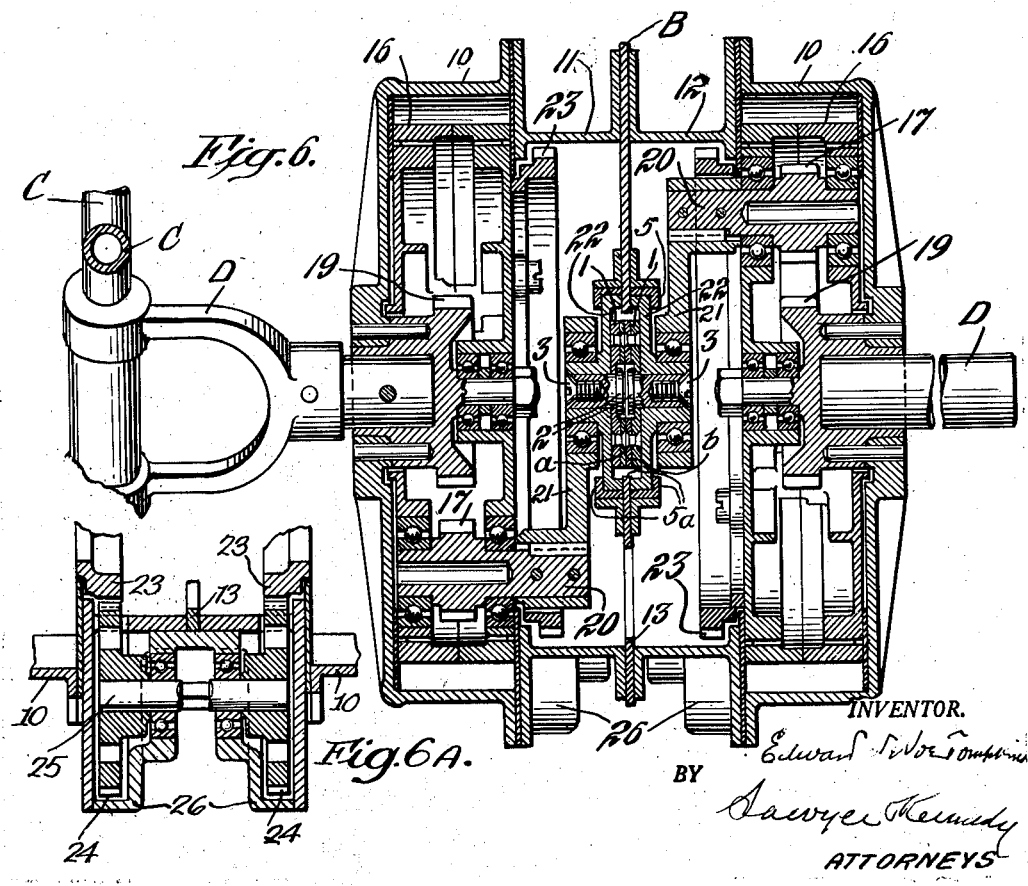
INVENTOR.
Edward De Voe Tompkins
BY
Sawyer Kennedy
ATTORNEYS April 8, 1952   E. DE V. TOMPKINS   2,591,747
DUAL RECIPROCATING BLADE SAWING APPARATUS
Filed July 17, 1946   6 Sheets-Sheet 4
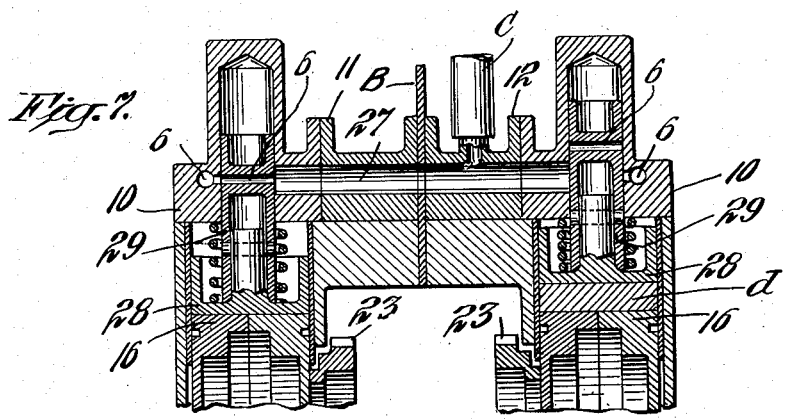
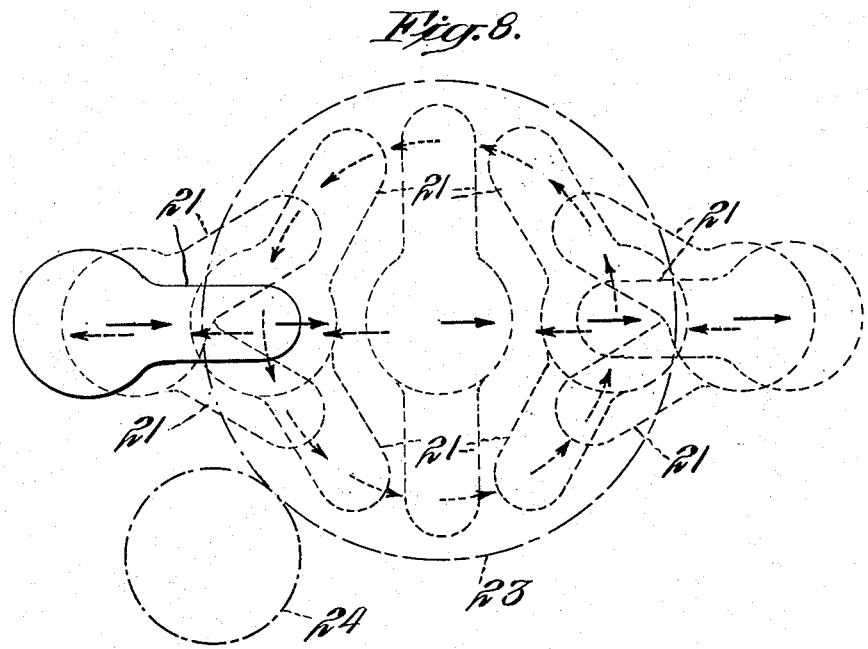
INVENTOR
Edward DeVoe Tompkins
BY
ATTORNEYS

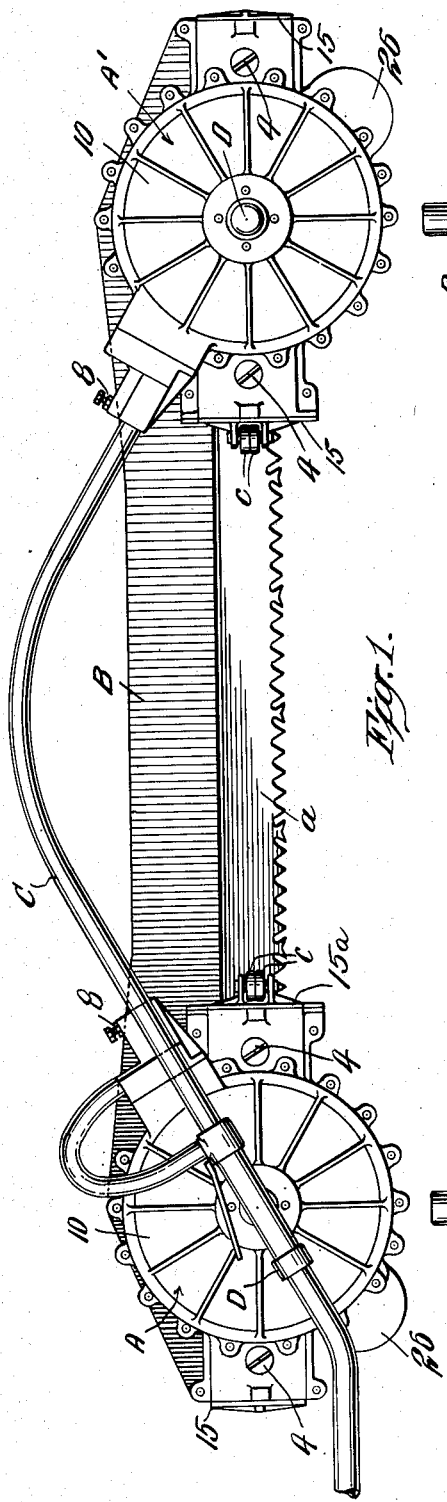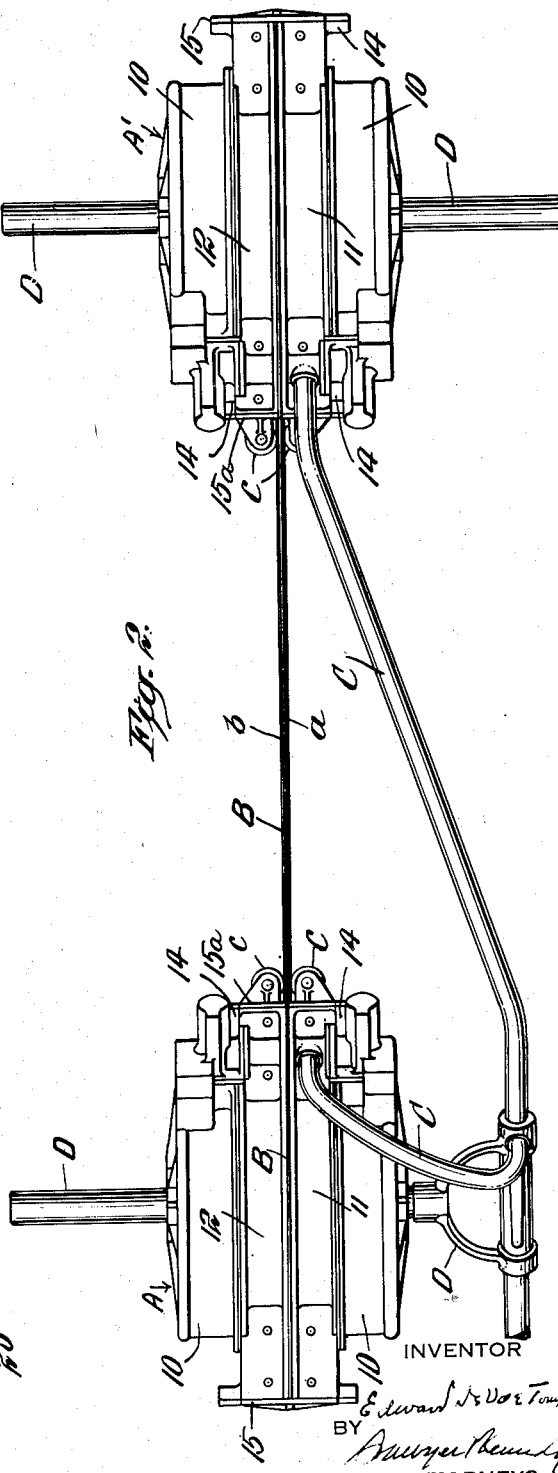

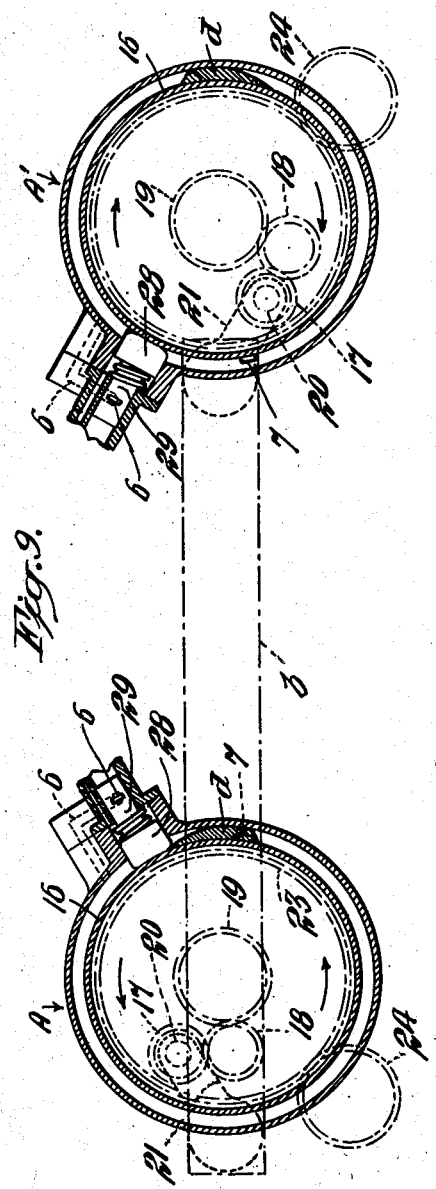
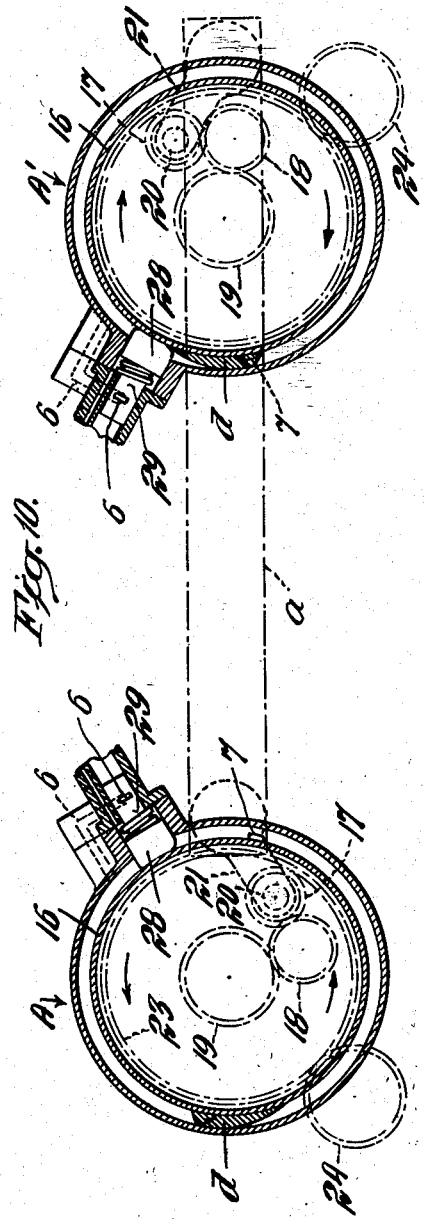

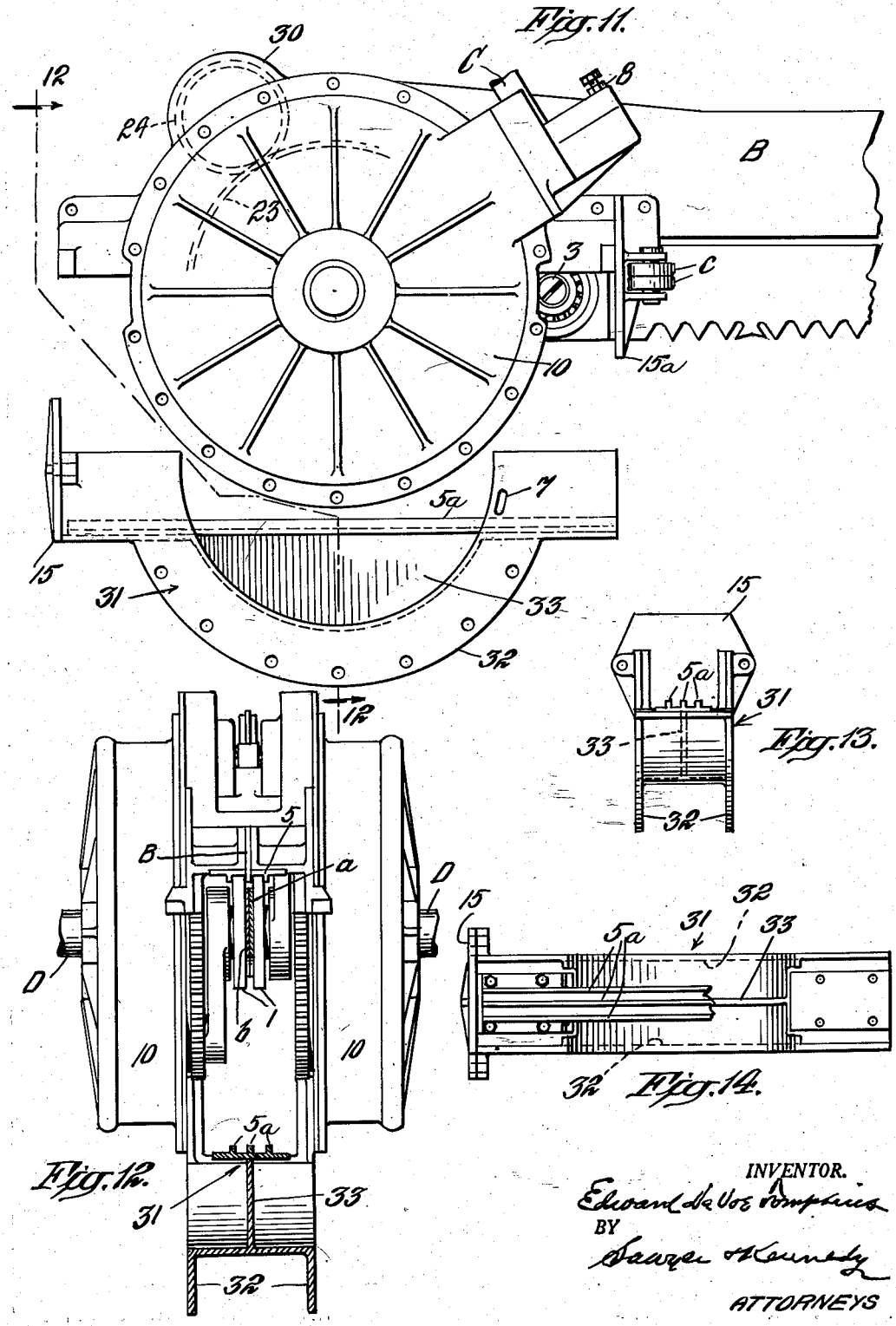

Patented Apr. 8, 1952

2,591,747

UNITED STATES PATENT OFFICE 2,591,747

DUAL RECIPROCATING BLADE SAWING APPARATUS

Edward De Voe Tompkins, New York, N. Y.

Application July 17, 1946, Serial No. 684,346

9 Claims. (Cl. 143—68)

This invention relates especially to portable power saws, the particular object being to provide an improved apparatus of this class employing two saw blades reciprocating in opposite directions in a single kerf, but certain features of the invention are applicable also to other machines and uses.

This invention has been made in connection with the machine of my prior Patents Nos. 2,283,958 and 2,284,693, in which patents I have described and claimed machines of the above class, in which the two reciprocating saw blades are operated by a single fluid rotary motor at one end, or preferably a similar motor at each end, acting through epicyclic gearing. The present invention in its preferred form employs rotary motors and similar epicyclic gearing, but each saw blade is driven by a separate motor and preferably by a motor at each end, resulting in a more even and smooth movement and better balancing of the machine and at the same time securing a saving of motor fluid and power.

The invention, therefore, consists in combinations of separate motors and driving gearing for reciprocating saw blades or other members in opposite directions side by side and in synchronism, and more particularly in combination with identical saw blades moving in the same kerf, and, further, in various features of construction and combinations of parts in such a machine and in rotary motors adapted for use therein, all as hereinafter described and claimed.

For a full understanding of the invention, a description of a portable sawing machine including all the features of the invention in a preferred form will now be given in connection with the accompanying drawings, and the features forming the invention specifically pointed out in the claims.

In the drawings:

Figure 1 is a side elevation of the machine with rotary motors at each end;

Figure 2 is a plan view of the same;

Figure 5 is a central, horizontal section partly in elevation, through one of the casings;

Figure 6 is a similar central vertical section with two of the cross-heads in central position;

Figure 7 is a cross section through the motor fluid connections and valves;

Figure 8 is a diagrammatic view showing the position of the epicyclic drive arm and cross-head at 30° points through a stroke in both directions;

Figure 9 is a diagrammatic section showing the position of operative parts on one of the blades near the end of its stroke to the left;

Figure 10 is a similar view showing the simultaneous position of the operative parts on the other blade;

Figure 11 is a side elevation of a casing, showing a modification with removable center dropped for removal of the saws;

Figure 12 is a sectional elevation on the line 12—12 of Figure 11;

Figures 13 and 14 are, respectively, detail end and plan views of the removable center on a smaller scale than Figures 11 and 12.

Figure 3:
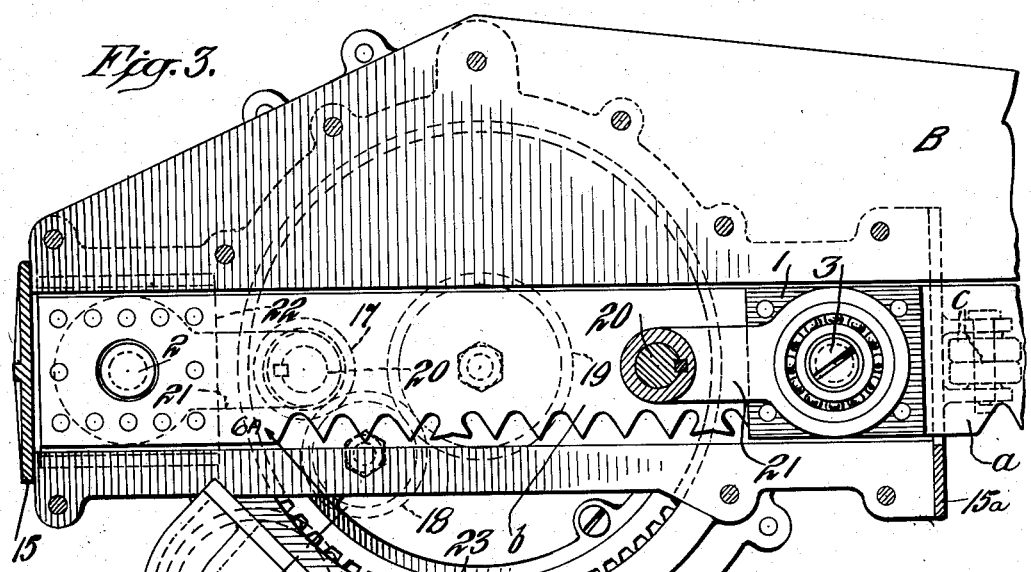
Figure 3 is a side elevation of one of the casings, with the casing sectioned to show the cross-head connection and synchronizing gearing.

Referring to the drawings, A, A' are the casings of the motors at the opposite ends of the machine, B is the dead or frame blade forming the sole fixed mechanical connection between the casings and C is the flexible air feed pipe for the four motors, the control of the air by the operator being by the usual hand operated valve in the pipe C convenient to one of the handles D used in the portable apparatus shown. The two saw blades $a$, $b$, are shown as of the same toothed form as in my prior patents referred to, with the teeth of such form as to press the blades together in cutting and provide a kerf of such width as to receive without friction the dead or frame blade B, but it will be understood that these teeth may be of any other form or arrangement desired to secure the required results. The construction as thus far described, therefore, is generally the same as in my prior patents referred to, except as to the use of the dead or frame blade B for connecting and positioning the casings and assuring the fixed tension of the saw blades and that the blades $a$, $b$ run between fixed rollers $c$, preferably mounted on ball bearings, at the inner ends of the casings, so as to provide a firm support for and pressure on the running blades at the point nearest the cutting portion of the blades.

The casings, motors and other operative parts are duplicated in the four motors so that a description of one will be sufficient.

In the preferred form as shown, the casing is made in four parts, the two similar parts 10 forming the ends and peripheral wall of the casing, with the annular rings 11 and 12 forming the connection between the end parts and the support for the central dead or frame blade B and a fixed lower plate 13, the dead blade and lower plate 13 (Fig. 6) forming the support for the cross-head guides, as described hereafter, all these casing parts being shown as secured together by bolted flanges, as usual. The end parts 10, also, are provided at opposite sides along the saw, with central extensions 14 having removable end heads 15 and 15a, the latter carrying the rollers c on the inner ends of the casings, these extensions 14 being of such length as to receive the saw blades and cross-head attachments for change of blades as described hereafter.

Referring now to the rotary motors and gearing, the peripheral walls and side walls of the casing parts 10, the rings 11, 12 and the peripheral walls of the extensions 14, in the construction shown, form the cylinders in which move the rotary pistons 16, each carrying the single driving vane d (Figs. 4, 9 and 10), the pistons being split circumferentially into the two parts (Figs. 6 and 7) to permit the assemblage in oil therein of the gear train consisting of the planet gear 17 and the change gear 18, the latter engaging the fixed gear 19, which is mounted centrally in the casing part 10, the ratio of rotation of the planet gear to the piston being 2 to 1 and the gearing arrangement being the same as in my Patent Number 2,284,693. The piston 16 rotates in ball bearings on the central hub of the fixed gear 19. The rotating shaft 20 of the planet gear 17 extends through the piston to the inner side of the cylinder wall and runs in the end of the drive arm 21 on side extension of cross-head 22, fixed to one end of one of the saw blades a, b, and the piston carries, also, on the inner side of the cylinder, cross connection gear 23, which engages gear 24 on a shaft 25 (Figs. 4 and 5), extending across the main casing within a casing 26 and carrying another gear 24 engaging gear 23 carried by the other piston, so that the two rotary motors and epicyclic gearing in each casing are fully synchronized and therefore the full synchronization of the movement of all the four motors is assured.

The saw blades may be connected to the cross-heads 22 and the parts assembled as in either of my prior patents referred to, but I have shown and preferably use a different connection and means for removal as follows: Each of the saw blades a, b has bolted or riveted on each end a reinforcing plate 1, and each end of the blades with this plate, is secured to a cross-head 22, back to back, by hollow cap studs 2 passing through the plates and into the cross-head and screws 3 seated in the cross-heads and entering the cap studs 2. On each side of the extensions 14 opposite the screws 3 in their extreme outer position are cap screws 4 closing openings for removing the screws. By moving the two ends of the blades and their cross-heads successively into the position shown in Figure 5 and removing the cap screws 4, the screws securing the blades to the cross-heads may be removed, and the blades with their plates 1 may be withdrawn from the cross-heads longitudinally as in my prior patents. The cross-heads run on plates B and 13 within guides 5 thereon, these guides being secured by flanges shown (Fig. 5) as bolted down to base plates at their ends.

Figure 4:
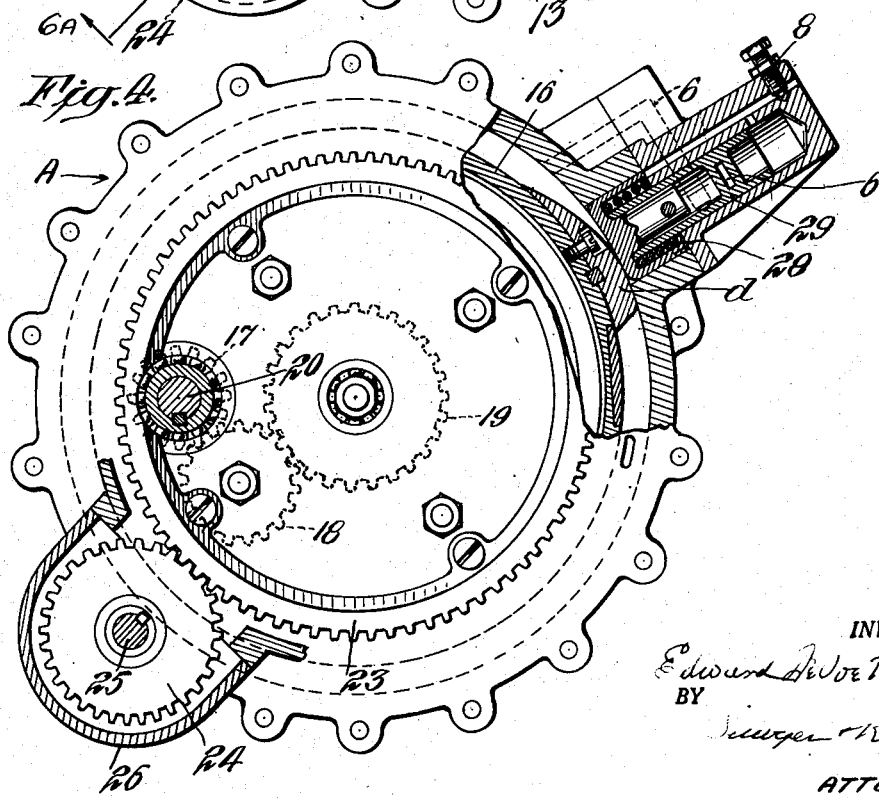
Figure 4 is a similar view with the casing sectioned to show the control valve and piston vane and gearing partly in section.

The air connection and control are shown in detail in Figures 4 and 7, in which the air inlet pipe C on each casing is connected by cross passage 27 to inlet ports 6 connecting with the respective cylinders in that casing and each controlled by spring pressed piston valve 29 so as to admit and cut off the air pressure as the piston rotates. The spring acts to press the piston valve inward to open the inlet port to the cylinder. The plunger 28 on the inner end of the piston valve 29 is pressed against the periphery of the piston 16 as the inlet valve opens and thus forms a cylinder head closing the cylinder behind the vane, and the vane d is tapered to a narrow edge at its forward end, so that as it closes the exhaust port 7 (Figs. 9 and 10), this narrow edge moves under the plunger 28 and aids in moving the plunger and inlet valve outward to close the inlet port 6. This closing of the valve is aided, also, by the compressed body of air trapped ahead of the vane as the exhaust port 7 is closed and thus, by the action of the vane on plunger 28 and the air thus trapped and compressed, a positive and prompt closure of the inlet port is secured. To prevent shock from sudden closure of the inlet valve, a dashpot with adjustable vent valve 8 (Fig. 4) is preferably used, this valve being adjusted to secure the smoothest running for cutting in the air. In cutting under water, the valve 8 will be closed. As the vane passes the piston, the piston valve is released and returned to open position by the spring and the plunger closes the cylinder space behind the vane, the rear end of the vane d preferably being beveled as shown, so as to permit the free and prompt entrance of the inlet air behind the vane as the inlet valve opens, and the plunger 28 in its inward movement also engages the bevel from the rear end of the vane and aids in the vane movement. The above operation and relative position of the four vanes and inlet valves near the end of the saw blade strokes in opposite directions is shown in Figures 9 and 10.

It will be clear from Figures 8, 9 and 10 that, with the planet gear ratio 2 to 1 in relation to piston rotation, the two drives on the same saw blade being out of phase 180° in the cycle, as shown, and the two drives identical, the inlet valve is closed through about 60° of the cycle near the end of the blade stroke, so that during this period two of the motors are receiving no air supply and doing no work. During this period of these two motors, however, the other two motors are at the point of their strokes where they are exerting sufficient power on the saw blades with the transverse drive of the live motors through gears 23, 24, 25 to compensate for this, and thus two motors are doing the work of all four motors during about one sixth of the operation, that is, during the 60° of the cycle near the end of each blade stroke. During the last 30° and the starting 30° of the stroke, therefore, when a small motor torque will produce large power on the blades, two of the motors are inactive for valve change, and the other two motors are driving the blades direct and through the transverse synchronizing gearing, so that each motor consumes compressed air only five sixths of the operating time. This results in a considerable economy of power, while at the same time assuring a smooth, uniform, balanced movement in the operation of the machine.

The exhaust from the motors is through ports 7 into the interior of the casings, from which the only escape of exhaust air is through the openings 9 in covers 15 on each side of the blade unit a, b, and thus wholly or partially into the kerf formed by the blades. The dead blade B is thin relatively to the kerf formed by the blades, so as to avoid friction and provide space for sawdust escape, and this strong blast of air, cooled to a low temperature by its expansion, thus not only sweeps the sawdust from the blades and kerf, upward past the dead blade, but secures an efficient cooling of the saw blades themselves and carries with it oil vapor from the casings for lubrication of the blades. The extent of this cooling will depend, of course, on the expansion of the air from inlet pressure to exhaust pressure. With an inlet pressure of 80 or 90 pounds per square inch, which has been found an efficient inlet air pressure under normal conditions, the expansion in doing the work will normally result in a reduction of this pressure to a pressure below 10 pounds, with consequent cooling of the air to a quite low temperature, which in practice has been found to cool the blades sufficiently under working conditions. The removal of the sawdust from the kerf is more efficient with this two blade unit, as the particles of sawdust are smaller than with a single saw, and the need, as with single blades, of raker teeth to drag the sawdust out at each end of the kerf is avoided.

In Figures 11 to 14 I have shown a modified arrangement of the casing and synchronizing cross gearing so as to permit the central portion of the casing and the lower guides for the cross-head to be removed so that the blades, after being detached from the cross-heads, may be moved endwise only sufficiently to release them from the cross-heads and then dropped down from the casings, providing a more convenient method of removing the blades for replacement or repair. This construction is the same as above described except that the cross connection gear shafts and their casings 24, 25, 26 which are otherwise as shown in Fig. 3 are in the upper part of the main casings and the lower central parts of the main casings are made removable and carry the lower cross-head guides and their supports. The casing for the synchronizing gearing is shown at 30 in the upper part of the casing and 31 is the detachable central portion of the casing carrying the flanges 32 for securing the two part casings together, with the central lower web 33 corresponding to the plate 13 at Figure 6 and carrying the bottom cross-head guides 5a, the lower central part 31 being free to be dropped on the removal of the flange bolts, so that the blades may be slipped longitudinally out of the cross-heads after releasing them and dropped vertically for removal and the machine fully assembled by the return of the blades and part 31 to position.

While I have shown and described that form of my machine which employs two motors at each end of the machine, and this is the preferred form and embodies important combinations of my invention in securing a balanced and uniform action throughout the stroke, economy of power, and substantially equal distribution of weight between the two operators in a portable machine, it will be understood that the invention includes, also, combinations and features which may be embodied in machines in which the casings are stationary or in machines having only one motor for each saw blade, these motors preferably being mounted in a single casing at one end of the saw blades, and the other ends of the blades being free or supported in any suitable manner. It will be understood, also, that while the invention is especially applicable in connection with toothed saw blades and for wood cross-cutting or ripping, it may be applied also with plain cutting blades and for cutting other materials. In using the term "saw" and "saw blades", therefore, it is intended to include smooth cutting blades except in cases in which the blades are defined as toothed saw blades. While I prefer to use air or other fluid motors, other types of rotary motors may be used within the broader features of the invention, and other modifications may be made in the construction shown, within the invention as defined by the claims.

What is claimed is:

1. A sawing apparatus comprising two associated saw blades arranged with their backs in contact to form a sawing unit and means for supporting and driving the blades, including a fluid rotary motor for each blade including a rotating piston, duplicate opposing epicyclic gear trains each actuating a saw blade and each comprising a fixed central gear, a change gear and a planetary gear meshing in sequence, said change gear and planetary gear being carried by a piston, a drive arm on each planetary gear and a pivot connection between the arm and a saw blade end, a synchronizing gear carried by each piston, and gearing connecting said synchronizing gears.

2. The combination with two members mounted to reciprocate, of four rotary fluid motors, two for each member, drive connections from each motor to its member, said connections being arranged to convert rotary motion into simultaneous rectilinear reciprocating motion of the members in opposite directions at equal speeds, each pair of motors that act on different members being arranged side by side, one of the two motors acting on the same member being inactive during a portion of the movement of said member near the end of the stroke in opposite directions, and the two drives on the same member being out of phase 180° in the cycle.

3. The combination with two members mounted to reciprocate, of four rotary fluid motors, two for each member, drive connections from each motor to its member, said connections being arranged to convert rotary motion into simultaneous rectilinear reciprocating motion of the members in opposite directions at equal speeds, each pair of motors acting on different members being arranged side by side, one of the two motors acting on the same member being inactive during a portion of the movement of said member near the end of the stroke in opposite directions, the two drives on the same member being out of phase 180° in the cycle, and synchronizing gearing between the connections from the motors to different members.

4. The combination with two members mounted to reciprocate, of two fluid rotary motors for each member, and drive connections from the motors to the members including epicyclic gear trains for each motor arranged to convert rotary motion into simultaneous rectilinear reciprocating motion of the members in opposite directions at equal speeds, each of said motors having a rotating piston carrying the moving members of its epicylic gear train.

5. The combination with two members mounted to reciprocate, of two fluid rotary motors for each member, and drive connections from the motors to the members including epicyclic gear trains for each motor arranged to convert rotary motion into simultaneous rectilinear reciprocating motion of the members in opposite directions at equal speeds, each of said motors having a rotating piston carrying the moving members of its epicylic gear train and synchronizing gears, and gearing connecting said synchronizing gears to assure synchronous movement.

6. The combination with two members mounted to reciprocate, of two rotary fluid motors arranged side by side and having rotary pistons rotating in the same direction and carrying single operating vanes phased 180° apart in the two motors, a fluid supply, valves controlling the inlets to the motors, driving connections transmitting power from said motors, and transverse gearing connecting said motors, whereby each motor alternately drives the other motor during the period in which its inlet valve is closed.

7. The combination with two members mounted to reciprocate, of four rotary fluid motors arranged in pairs, each pair side by side and having rotary pistons rotating in the same direction, each of said motors having a single operating vane, each side by side pair of motors being phased 180° apart and the other pair of motors rotating in the opposite direction and phased 180° from the side by side motors, a fluid supply, inlet valves controlling the fluid supply to the motors, one of the said reciprocable members being connected to a motor of each side by side pair and the other reciprocable member being connected to the other motors of the two said pairs, and transverse gearing connecting the motors of each side by side pair, whereby each motor in each side by side pair alternately drives the other motor of such side by side pair during the period in which its inlet valves is closed.

8. The combination with two members mounted to reciprocate, of a rotary fluid motor for each member, each said rotary fluid motor comprising a hollow rotating piston divided circumferentially and carrying between the parts the movable gears of an epicylic train of gearing and means connecting the epicyclic train to the associated reciprocable member for reciprocating the same.

9. The combination according to claim 8, in which each said fluid motor comprises also a synchronizing gear carried on the side of its piston and in which gear means meshing with the two said synchronizing gears is provided for synchronizing the two said motors.

EDWARD DE VOE TOMPKINS.

REFERENCES CITED

The following references are of record in the file of this patent:

UNITED STATES PATENTS

| Number | Name | Date |
|---|---|---|
| 139,426 | Scholfield | May 27, 1873 |
| 308,188 | Miller | Nov. 18, 1884 |
| 720,944 | Meiklejohn | Feb. 17, 1903 |
| 823,228 | Shepard | June 12, 1906 |
| 825,315 | Hamachek | July 10, 1906 |
| 970,035 | Frazer et al. | Sept. 13, 1910 |
| 1,215,431 | Tompkins | Feb. 13, 1917 |
| 1,326,713 | Dean | Dec. 30, 1919 |
| 1,349,698 | Tompkins | Aug. 17, 1920 |
| 1,491,134 | De Northall | Apr. 22, 1924 |
| 1,556,547 | Ricard | Oct. 6, 1925 |
| 1,710,970 | De Northall | Apr. 30, 1929 |
| 1,793,053 | Cahill et al. | Feb. 17, 1931 |
| 2,037,121 | Dean | Apr. 14, 1936 |
| 2,064,676 | Mac Leod | Dec. 15, 1936 |
| 2,283,958 | Tompkins | May 26, 1942 |
| 2,284,693 | Tompkins | June 2, 1942 |
| 2,301,098 | Twyman | Nov. 3, 1942 |

FOREIGN PATENTS

| Number | Country | Date |
|---|---|---|
| 53,297 | Sweden | Dec. 27, 1922 |
| 208,301 | Switzerland | Apr. 16, 1940 |